United States Patent
Tie et al.

(10) Patent No.: US 9,820,316 B2
(45) Date of Patent: Nov. 14, 2017

(54) PREVENTING ASYMMETRIC ROUTING USING NETWORK TUNNELING

(71) Applicant: Aerohive Networks, Inc., Milpitas, CA (US)

(72) Inventors: Jun Tie, San Jose, CA (US); Changming Liu, Cupertino, CA (US)

(73) Assignee: Aerohive Networks, Inc., Milpitas, CA (US)

( * ) Notice: Subject to any disclaimer, the term of this patent is extended or adjusted under 35 U.S.C. 154(b) by 57 days.

(21) Appl. No.: 14/217,180

(22) Filed: Mar. 17, 2014

(65) Prior Publication Data

US 2014/0269564 A1 Sep. 18, 2014

Related U.S. Application Data

(60) Provisional application No. 61/802,355, filed on Mar. 15, 2013.

(51) Int. Cl.
*H04W 76/02* (2009.01)

(52) U.S. Cl.
CPC ............................. *H04W 76/022* (2013.01)

(58) Field of Classification Search
CPC .................. H04L 12/287; H04L 12/4633; H04L 45/306; H04L 45/38; H04L 47/10;
(Continued)

(56) References Cited

U.S. PATENT DOCUMENTS 7,386,630 B2 * 6/2008 Liong ................. H04L 41/0893
  709/236
8,270,413 B2 * 9/2012 Weill .................. H04L 12/4633
  370/389

(Continued)

FOREIGN PATENT DOCUMENTS

SE  WO 2012130308 A1 * 10/2012 ........ H04W 36/0011

OTHER PUBLICATIONS

Kosta et al., Security Comparison of Wired and Wireless Network with Firewall and Virtual Private Network (VPN), Telecommunication and Computing (ITC), 2010 International Conference on Recent Trends in Information, Mar. 13, 20120, p. 281-283.*

(Continued)

*Primary Examiner* — Benjamin H Elliott, IV
*Assistant Examiner* — Eric Nowlin
(74) *Attorney, Agent, or Firm* — Sheppard, Mullin, Richter & Hampton LLP

(57) ABSTRACT

Various implementations described herein relate to routing network data traffic using network tunnels. In some implementations, one or more tunnels are established between a remote gateway device and a central gateway system. The central gateway system receives data traffic-to-tunnel information from the remote gateway device, and the central gateway system incorporates the data traffic-to-tunnel information in a data traffic-to-tunnel mapping. The data traffic-to-tunnel information comprises n-tuple of network flow information, network flow tags, application-to-tunnel binding information, or the like. The central gateway system receives first data traffic from the remote gateway and forwards the first data traffic to a server. Subsequently, the central gateway system receives second data traffic and forwards the first data traffic to the remote gateway device over one or more select tunnels selected from the established tunnels. The select tunnels can be selected based on based at least in part on the data traffic-to-tunnel mapping.

25 Claims, 5 Drawing Sheets

(58) Field of Classification Search
CPC ............ H04L 47/2408; H04L 47/2411; H04L 47/2483; H04L 47/803; H04L 47/824; H04L 47/825; H04L 49/3009; H04L 63/029; H04L 63/168; H04L 65/80; H04L 47/2403; H04W 12/06; H04W 48/08; H04W 76/022; H04W 76/041; H04W 76/045; H04W 84/12; H04W 88/08
See application file for complete search history.

(56) References Cited

U.S. PATENT DOCUMENTS

| | | | | |
|---|---|---|---|---|
| 8,307,422 | B2* | 11/2012 | Varadhan | H04L 12/4633 713/151 |
| 8,325,638 | B2* | 12/2012 | Jin | H04L 12/14 370/310 |
| 8,402,538 | B2* | 3/2013 | Kim | H04L 63/1416 709/224 |
| 8,565,091 | B2* | 10/2013 | Pongracz | H04L 47/2441 370/229 |
| 8,582,480 | B2* | 11/2013 | Jin | H04L 12/14 370/310 |
| 8,588,238 | B2* | 11/2013 | Weill | H04L 12/4633 370/389 |
| 8,869,235 | B2* | 10/2014 | Qureshi | H04L 63/20 713/150 |
| 8,886,925 | B2* | 11/2014 | Qureshi | H04L 63/20 713/150 |
| 8,891,406 | B1* | 11/2014 | Shekhar | H04L 12/5689 370/255 |
| 8,942,096 | B2* | 1/2015 | Arvidsson | H04L 47/10 370/235 |
| 8,942,242 | B2* | 1/2015 | Weill | H04L 12/4633 370/389 |
| 8,955,100 | B2* | 2/2015 | Varadhan | H04L 12/4633 726/15 |
| 8,971,335 | B2* | 3/2015 | Harel | H04L 45/02 370/401 |
| 9,077,654 | B2* | 7/2015 | Davis | H04L 45/60 |
| 9,100,268 | B2* | 8/2015 | Dolganow | H04L 12/4633 |
| 9,118,556 | B2* | 8/2015 | Li | H04L 12/4633 |
| 9,137,262 | B2* | 9/2015 | Qureshi | H04L 63/20 |
| 9,143,530 | B2* | 9/2015 | Qureshi | H04L 63/20 |
| 9,183,380 | B2* | 11/2015 | Qureshi | G06F 21/53 |
| 9,215,588 | B2* | 12/2015 | Andreasen | H04L 63/0869 |
| 9,264,942 | B2* | 2/2016 | Sarkar | H04W 28/24 |
| 9,338,094 | B2* | 5/2016 | Kotha | H04L 45/745 |
| 9,614,772 | B1* | 4/2017 | Bradfield | H04L 47/2441 |
| 9,621,463 | B2* | 4/2017 | Kotha | H04L 45/745 |
| 9,628,292 | B2* | 4/2017 | Dronadula | H04L 12/4633 |
| 2005/0220014 | A1* | 10/2005 | DelRegno | H04L 47/10 370/230 |
| 2007/0002832 | A1* | 1/2007 | Sylvain | H04L 63/0892 370/352 |
| 2007/0121615 | A1* | 5/2007 | Weill | H04L 12/4633 370/389 |
| 2009/0213858 | A1* | 8/2009 | Dolganow | H04L 12/4633 370/395.5 |
| 2010/0043068 | A1* | 2/2010 | Varadhan | H04L 12/4633 726/15 |
| 2010/0138920 | A1* | 6/2010 | Kim | H04L 63/1416 726/22 |
| 2010/0142373 | A1* | 6/2010 | Jin | H04L 12/14 370/230 |
| 2011/0002240 | A1* | 1/2011 | Harel | H04L 45/02 370/254 |
| 2011/0110294 | A1* | 5/2011 | Valluri | H04W 8/26 370/328 |
| 2012/0092995 | A1* | 4/2012 | Arvidsson | H04L 47/10 370/235 |
| 2012/0106338 | A1* | 5/2012 | Pongracz | H04L 47/2441 370/235 |
| 2012/0263183 | A1* | 10/2012 | Weill | H04L 12/4633 370/395.53 |
| 2013/0064082 | A1* | 3/2013 | Jin | H04L 12/14 370/230 |
| 2013/0074177 | A1* | 3/2013 | Varadhan | H04L 12/4633 726/15 |
| 2013/0318345 | A1* | 11/2013 | Hengeveld | H04L 12/4633 713/168 |
| 2014/0007048 | A1* | 1/2014 | Qureshi | G06F 21/10 717/110 |
| 2014/0007182 | A1* | 1/2014 | Qureshi | G06F 21/10 726/1 |
| 2014/0071830 | A1* | 3/2014 | Weill | H04L 12/4633 370/241 |
| 2014/0189074 | A1* | 7/2014 | Parker | H04L 63/20 709/220 |
| 2014/0254368 | A1* | 9/2014 | Zhang | H04L 47/2441 370/235 |
| 2014/0317276 | A1* | 10/2014 | Tie | H04L 45/306 709/224 |
| 2015/0058916 | A1* | 2/2015 | Rostami-Hesarsorkh | H04L 63/1408 726/1 |
| 2015/0063158 | A1* | 3/2015 | Nedeltchev | H04W 76/00 370/253 |
| 2016/0218974 | A1* | 7/2016 | Kotha | H04L 45/745 |
| 2016/0315785 | A1* | 10/2016 | Dronadula | H04L 12/4633 |
| 2017/0085473 | A1* | 3/2017 | Zhu | H04L 45/64 |
| 2017/0134265 | A1* | 5/2017 | Haddad | H04L 45/38 |
| 2017/0142068 | A1* | 5/2017 | Devarajan | H04L 63/0254 |

OTHER PUBLICATIONS

Chen et al., Design and implementation of IPv6 tunnel deployed in in-vehicle network, 2011 IEEE 3rd International Conference on Communication Software and Networks (ICCSN), May 29, 2011, pp. 533-536.*
Calhoun et al., Control and Provisioning of Wireless Access Points (CAPWAP) Protocol Specification, IETF, Mar. 2009.*
Blanchet et al., IPv6 Tunnel Broker with the Tunnel Setup Protocol (TSP), Feb. 2010, IETF.*

* cited by examiner

PREVENTING ASYMMETRIC ROUTING USING NETWORK TUNNELING

CROSS-REFERENCE TO RELATED APPLICATIONS

The present application claims the benefit of U.S. Provisional Patent Application Ser. No. 61/802,355, filed Mar. 15, 2013 and entitled "Application-Based Routing," which is incorporated by reference herein.

BACKGROUND

An area of ongoing research and development is in improving performance of communication over a communications network, and in particular a wireless network. Wireless networks are frequently governed by 802.11 standards. While not all networks need to use all of the standards associated with 802.11, a discussion of the standards by name, such as 802.11n provides, at least partly because the standards are well-known and documented, a useful context in which to describe issues as they relate to wireless systems.

An important aspect of providing network services in an enterprise network is utilizing two or more network connections in parallel to establish network communication between a local network at a company site (e.g., branch office, remote office, or satellite office) and the remainder of the company's larger enterprise network (e.g., company's central network, which may be located at a headquarter data center or a head office). Each network connection can vary in medium (e.g., wired or wireless), technology (e.g., 802.11, LTE, DSL, etc.), bandwidth, and/or service provider (e.g., cable, cellular, telephone, or Internet service provider). By using more than one network connection to connect a given company site (e.g., a branch router serving as a network gateway device) to the remainder company enterprise network (e.g., via a central network gateway device), the given company site can not only benefit from increased bandwidth (e.g., load-balancing, or aggregated network bandwidth provided by the multiple network connections), but also network redundancy (e.g., each network connection can serve as a fail over for another network connection).

Company sites often rely on the multiple network connections to establish one or more network tunnels with the central enterprise network, whereby the network tunnels enable a secure connection with the central enterprise network over a public network (e.g., over the Internet) and/or permit simple (data) payload delivery over different network technologies having incompatible payload delivery mechanisms (e.g., cellular, microwave, Bluetooth®, WiFi, Ethernet, Token Ring, ATM, etc.). Network tunnels are commonly used by company sites to establish a virtual private network (VPN) connection with a company's enterprise network, thereby providing the local network at the company site with transparent access to the company's largely enterprise network.

The foregoing examples of the related art and limitations related therewith are intended to be illustrative and not exclusive. For Example, wireless clients may use different protocols other than 802.11, potentially including protocols that have not yet been developed. However, problems associated with performance may persist. Other limitations of the relevant art will become apparent to those of skill in the art upon a reading of the specification and a study of the drawings.

SUMMARY

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

Various implementations described herein relate to routing network data traffic using network tunnels. Some implementations involve a remote network gateway device (hereafter, remote gateway device), a central network gateway device (hereafter, central gateway system), and one or more virtual network tunnels (hereafter, network tunnels or tunnels) established between the remote gateway device and central gateway systems over a network. Each of the one or more the tunnels can be established using Control and Provisioning of Wireless Access Points (CAPWAP), Lightweight Access Point Protocol (LWAPP), Oplet Runtime Environment (ORE), Generic Routing Encapsulation (GRE), secure shell (SSH), and the like. In some implementations, the remote gateway device serves one or more client devices of a network and provides those client devices with routes to one or more other networks. In some implementations, the central gateway system is a cloud virtual gateway.

In some implementations, data traffic-to-tunnel information is received from a remote gateway device and, in particular implementations, the data traffic-to-tunnel information from the remote gateway device is received by a central gateway system. The data traffic-to-tunnel information (e.g., n-tuple of network flow information, application-to-tunnel binding information, etc.) that can be used by the central gateway system to determine how data traffic should be routed (from the central gateway system) to the remote gateway device using the one or more tunnels. In some implementations, the data traffic-to-tunnel information is incorporated into a data traffic-to-tunnel mapping (e.g., by way of installation or modification of the mapping), which can be subsequently used to determine how data traffic should be routed (from the central gateway system) to the remote gateway device using the one or more tunnels. Subsequently, in some implementations, data traffic (e.g., one or more network packets) is received from the server and forwarded to the remote gateway device over one or more select tunnels, where the select tunnels are selected from a set of tunnels established with the remote gateway device, and where the select tunnels are selected based at least in part on the data traffic-to-tunnel mapping. In various implementations, the set of tunnels comprises a plurality of tunnels, thereby providing multiple network data paths between the first and second network devices. In some implementations, the central gateway system receives the data traffic from the server, and in some implementations, the central gateway system forwards the data traffic over the one or more particular tunnels established with the remote gateway device.

In certain implementations, the data traffic from the server is analyzed before it is forwarded to the remote gateway device, and the particular tunnels are selected base at least in part on analysis of the data traffic (e.g., type of data traffic) and the data traffic-to-tunnel mapping. In certain implementations, the analysis of the data traffic identifies an application or an application type associated with the data traffic, and can do so based on application data carried by the data traffic, such as Layer-7 network data. Application data can include, for example, data associated with as Skype®, YouTube®, Google®, Gmail®, Spotify®, Twitter®, Facebook®, BitTorrent, instant message (IM), voice-over-IP (VoIP), computer games, and other applications or application types. In some implementations, the type of application data contained in the data traffic (from the server) determines what tunnel or tunnels are used to forward the data traffic to the remote gateway device. In some implementations, the data traffic received from the server (and subsequently forwarded to the remote gateway device) is generated by the server in response to a data traffic (e.g., a data request) forwarded from the remote gateway device to the server.

In some implementations, one or more tunnels are selected from a set of tunnels based one or more attributes associated with one or more of the tunnels in the set. Attributes associated with the tunnels can include, for example, tunnel type (e.g., ORE, GRE, CAPWAP, LWAPP, or SSH-based tunnel), a data rate associated with a given tunnel, the type or types of network connections associated with the tunnel (e.g., wired, wireless, Ethernet, 3G, 4G, 802.11, etc.), and the like.

In some implementations, data traffic is received from the remote gateway device and forwarded to a server (e.g., based on the type of data traffic). In some such implementations, the data traffic received from the remote gateway device can include the data traffic-to-tunnel information from the remote gateway device.

These and other advantages will become apparent to those skilled in the relevant art upon a reading of the following descriptions and a study of the several examples of the drawings.

DETAILED DESCRIPTION

Figure 1:
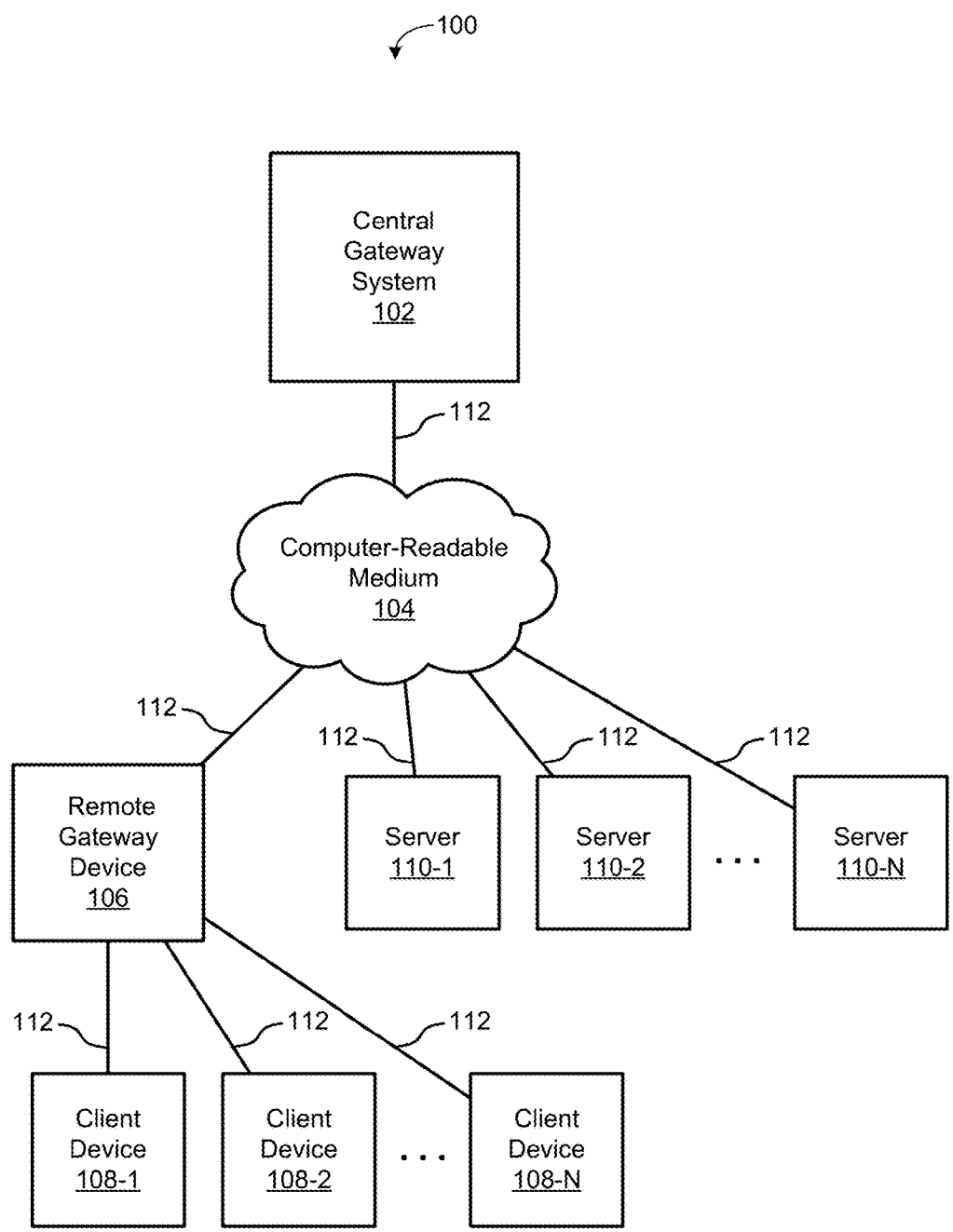
FIG. 1 depicts a diagram of an example of a system for routing data traffic using tunnels.

FIG. 1 depicts a diagram 100 of an example of a system for routing data traffic using tunnels. In particular implementations, the system depicted in FIG. 1 utilizes tunnels to provide application-based data traffic routing, policy-based data traffic routing, or some combination of both. The example system shown in FIG. 1 includes a central network gateway system 102 (hereafter, the central gateway system 102), a computer-readable medium 104, a remote network gateway device 106 (hereafter, the remote gateway device 106), one or more client devices 108-1 thru 108-N (hereafter, collectively referred to as the client devices 108), one or more servers 110-1 thru 110-N (hereafter, collectively referred to as the servers 110), and data paths 112. As shown in FIG. 1, the data paths 112 couple the central network gateway system 102 to the computer-readable medium 104, couple the computer-readable medium 104 to the remote gateway device 106, couple the remote gateway device 106 to the client devices 108, and couple the computer-readable medium 104 to the servers 110. In some implementations, the central gateway system 102 can communicate with the remote gateway device 106 through the computer-readable medium 104, and the central gateway system 102 can communicate with the servers 110 through the computer-readable medium 104. In some implementations, one or more of the servers 110 can communicate with the client devices 108 via one or more tunnels established between the central gateway system 102 and the remote gateway device 106 over the computer-readable medium 104 (e.g., a network).

As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the computer-readable medium 104 can represent a bus or other memory device on a computer that includes one or more of the other components illustrated as coupled to the computer-readable medium 104 in the example of FIG. 1. Where the computer-readable medium 104 includes more than one computing device, the computer-readable medium 104 would typically be characterized as including a "network." The computer-readable medium 104 can include wired and wireless networks. In a wired communications context, the computer-readable medium 104 can include a wired network, such as a local area network (LAN) or wide area network (WAN). In a wireless communications context, the computer-readable medium 104 can include a wireless LAN (WLAN).

Assuming the computer-readable medium 104 includes a network, the network can be practically any type of communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, the network 104 can include, for example, a WAN, metropolitan area network (MAN), campus area network (CAN), or LAN, but the network 104 could at least theoretically be of any size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office or headquarters and optional branch or regional offices (collectively, offices). Many offices enable remote users to connect to the private network offices via some other network, such as the Internet. The example of FIG. 1 is intended to illustrate a computer-readable medium 104 that may or may not include more than one private network.

The central gateway system 102, the remote gateway device 106, the client devices 108, the servers 110, and other systems or devices described in this paper, can be implemented by one or more a computer systems or as part of one or more computer systems. A computer system, as used in this paper, is intended to be construed broadly and can include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software modules that are executed by the processor. Depending upon implementation-specific, configuration-specific, or other considerations, an engine can be centralized or its functionality distributed. An engine can be a specific purpose engine that includes specific purpose hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, a data path enables communication of data traffic between two or more systems, devices, or components thereof described in this paper. Data paths can include wired and wireless network data paths, such as those implemented using 802.11, Ethernet, Fiber, cellular, and the like, which permit systems or devices described herein to communicate with one another over a network. Data paths can also include network tunnels established between network devices. Additionally, as used herein, data traffic will be understood to comprise any form of computer-readable data that can be communicated to or from a computer-readable medium, a system, a device, or a component thereof. For example, the data traffic can be network data traffic that is communicated over computer-readable media (e.g., networks) between systems and devices. For various implementations described herein, the data traffic comprises network packets, network frames, or the like, configured to traverse over one or more wired or wireless network paths from a source network device (e.g., a remote gateway device) to a destination network device (e.g., a central gateway system). The data traffic can comprise a data payload, which can include data associated with a particular application or a particular application type (e.g., Layer-7 network data).

In the example system shown in FIG. 1, the central gateway system 102 is coupled to the computer-readable medium 104 via one of the data paths 112. Through the computer-readable medium 104, the central gateway system 102 can communicate with the remote gateway device 106 and one or more of the servers 110. In some implementations, the central gateway system 102 forms a network (or part of a network) with the remote gateway device 106, and the central gateway system 102 forms another network (or part of another network) with the one or more servers 110. Depending on the specific implementation, the central gateway system 102 can be implemented as a dedicated network gateway device, as part of a dedicated network gateway device, or as a cloud-based service, such as a cloud virtual gateway (CVG).

In certain implementations, one or more network tunnels are established over the computer-readable medium 104 between the central gateway system 102 and the remote gateway device 106. Each of the tunnels between the central gateway system 102 and the remote gateway device 106 can be established using one or more network protocols or technologies, including Control and Provisioning of Wireless Access Points (CAPWAP), the Lightweight Access Point Protocol (LWAPP), Oplet Runtime Environment (ORE), Generic Routing Encapsulation (GRE) and the like. In some implementations, the one or more tunnels established between the central gateway system 102 and the remote gateway device 106 permit the remote gateway device 106, the client devices 108, or both to communicate with (e.g., access) the central gateway system 102. Additionally, in some implementations, the one or more tunnels established between the central gateway system 102 and the remote gateway device 106 permit the remote gateway device 106, the client devices 108, or both to communicate with computing resources accessible to the central gateway system 102 but not directly accessible to the remote gateway device 106 or the client devices 108. For example, the computing resources accessible to the central gateway system 102 may include those that are part of a private network accessible by the central gateway system 102 but not accessible by the remote gateway device 106 or the client devices 108. In certain implementations, the central gateway system 102 and the servers 110 are part of a private network, and the remote gateway device 106, the client devices 108, or access the servers 110 by way of the central gateway system 102. In some such implementations, one or more tunnels established between the central gateway system 102 and the remote gateway device 106 enable the client devices 108, which are linked to the remote gateway device 106, to communicate with the servers 110 by way of the remote gateway device 106, the one or more tunnels, and the central gateway system 102. As used herein, communication between computer-readable media, systems, devices, and components thereof will be understood include data traffic, which may be carrying data associated with one or more particular applications (e.g., Skype®, Gmail®, etc.) or particular application types (e.g., gaming, instant messaging, VoIP etc.).

In some implementations, one or more tunnels one or more tunnels established between the central gateway system 102 and the remote gateway device 106 such that the central gateway system 102, the remote gateway device 106, the client devices 108, and the servers form a virtual private network (VPN). In some such implementations, the central gateway system 102 operates as a virtual private network (VPN) terminator, and the remote gateway device 106 operates as a VPN client that establishes a VPN connection with the central gateway system 102 using the one or more tunnels.

In the example of operation, the central gateway system 102 functions to establish one or more tunnels with the remote gateway device 106. In some implementations, the central gateway system 102 receives data traffic-to-tunnel information from the remote gateway device 106 and incorporates the data traffic-to-tunnel information into a data traffic-to-tunnel mapping, which can be maintained at the central gateway system 102. In some such implementations, the central gateway system 102 receives the data traffic-to-tunnel information, from the remote gateway device 106, as part of data traffic the remote gateway device 106 sends to the central gateway system 102 over the one or more established tunnels. Depending on the implementation, the data traffic-to-tunnel information can comprise an n-tuple of network flow information, or application-to-tunnel binding information. Additionally, depending on the implementation, incorporation of the data traffic-to-tunnel information into the data traffic-to-tunnel mapping can comprise installing the data traffic-to-tunnel information into the data traffic-to-tunnel mapping, generating the data traffic-to-tunnel mapping (e.g., where one does not already exist), modifying the data traffic-to-tunnel mapping (e.g., to update the mapping), or the like. For some implementations, once the data traffic-to-tunnel information is incorporated into the data traffic-to-tunnel mapping, the data traffic-to-tunnel mapping is used by the central gateway system 102 to determine how data traffic should be routed from the central gateway system 102 to the remote gateway device 106 using the one or more tunnels.

For example, the central gateway system 102 can receive data traffic from the remote gateway device 106 originating from one of the client devices 108. The central gateway system 102 can receive the data traffic from the remote gateway device 106 over a set of tunnels established between the central gateway system 102 and the remote gateway device 106. Based on the data content (e.g., network destination address) of the data traffic, the central gateway system 102 can forward the data traffic to a particular one of the servers 110. After receiving the data traffic from the central gateway system 102 (e.g., request for multimedia data stream), the particular one of the servers 110 can transmit responsive data traffic (e.g., multimedia data stream) to the client devices 108 through the central gateway system 102. In some implementations, the central gateway system 102 receives the responsive data traffic from the particular one of the servers 110 and forwards the responsive data traffic to the remote gateway device 106 using one or more specific tunnels in the set of tunnels. For some implementations, the central gateway system 102 selects one or more specific tunnels, in the set of tunnels, using a data traffic-to-tunnel mapping maintained by the central gateway system 102. In some implementations, the central gateway system 102 selects a single tunnel, in the set of tunnels between the central gateway system 102 and the remote gateway device 106, to the exclusion of all others tunnels in the set of tunnels.

In some implementations, before the central gateway system 102 forwards data traffic to the remote gateway device 106 (e.g., data traffic addressed to one of the client devices 108), the central gateway system 102 analyzes the data traffic to determine how it should be routed to the remote gateway device 106 using one or more a set of tunnels between the central gateway system 102 and the remote gateway device 106. In particular, the central gateway system 102 can select one or more particular tunnels in the set of tunnels based at least in part on the analysis of the data traffic (e.g., type of Layer-7 network data being carried by the data traffic). In certain implementations, the analysis of the data traffic assists the central gateway system 102 in identifying an application or an application type associated with the data traffic (e.g., Skype®, YouTube®, Google®, Gmail®, Spotify®, Twitter®, Facebook®, BitTorrent, instant message (IM), voice-over-IP (VoIP), etc.). In some implementations, based on the data traffic-to-tunnel mapping and the identified application or application type associated with the data traffic, the central gateway system 102 determines what tunnel or tunnels are used to forward the data traffic to the remote gateway device 106. Depending on the implementation, the data traffic-to-tunnel mapping can identify one or more tunnels, between the central gateway system 102 and the remote gateway device 106, that the central gateway system 102 should use when to send data traffic associated with a particular application or application type.

In the example system shown in FIG. 1, the remote gateway device 106 is coupled to the computer-readable medium 104 and the client devices 108. In FIG. 1, intended to represent a network device serves as network gateway to the one or more client devices 108 to which is the remote gateway device 106 is coupled. Depending on the specific implementation, the remote gateway device 106 can be implemented as a dedicated network gateway device, as part of a dedicated network gateway device, or as a cloud-based service. For example, the remote gateway device 106 can be a wired or wireless bridge, router, virtual private network (VPN) gateway, access point (AP), switch that communicatively linked to each of the client devices 108. The remote gateway device 106 can be an applicable device used in connecting a client device to a network. In some implementations, the remote gateway device 106 represents a network device located a regional or branch office, and the central gateway system 102 represents a head office or headquarter.

In the example of operation, the remote gateway device 106 functions to implement a data traffic routing policy for routing data traffic associated with an application or an application type over one or more tunnels. In some implementations, the routing policy defines how data traffic from one or more of the client devices is routed to the central gateway system 102, over the one or more tunnels, based on application data contained in the data traffic. In some implementations, the routing policy is implemented for a first application, instantiated as a first engine at one of the servers 110, and a second application, instantiated as a second engine at one of the servers 110. In some implementations, the first engine or the second engine is instantiated at one of the servers 110 that provides the first application or the second application as a service to one of the client devices 108.

In some implementations, the remote gateway device 106 establishes one or more tunnels with the central gateway system 102. The remote gateway device 106 can receive data traffic is received from one or more of the client devices 108 and can analyze the data traffic receive from the client devices 108. Based at least in part on the resulting analysis of the data traffic, the remote gateway device 106 can identify an application or an application type associated with the data traffic. For various implementations, the application or the application type associated with the first data traffic is identified based on application data carried by the data traffic, such as Layer-7 network data. Application data can include, for example, data associated with as Skype®, YouTube®, Google®, Gmail®, Spotify®, Twitter®, Facebook®, BitTorrent, instant message (IM), voice-over-IP (VoIP), computer games, and other applications or application types. In certain implementations, the remote gateway device 106 uses the identified application or the application type associated with the data traffic to determines what tunnel or tunnels are used to route the data traffic to the central gateway system 102. In some such implementations, the remote gateway device 106 selects what tunnel or tunnels are used to route the data traffic to the central gateway system 102 further based a data traffic routing policy installed at the remote gateway device 106, which can define what tunnel or tunnels are to be utilized for data traffic associated with a particular application or application type. In some implementations, the remote gateway device 106 selects a single tunnel, in the set of tunnels between the remote gateway device 106 and the central gateway system 102, to the exclusion of all others tunnels in the set of tunnels. In some implementations, one or more select tunnels are selected from a set of tunnels established between the remote gateway device 106 and the central gateway system 102. depending on the implementation, the set of tunnels can comprise a plurality of tunnels, thereby providing multiple network data paths between the remote gateway device 106 and the central gateway system 102 for routing data traffic from the remote gateway device 106 to the central gateway system 102 (and vice versa).

Eventually, in some implementations, the remote gateway device 106 routes the data traffic, received from one of the client devices 108, to the central gateway system 102 using the one or more tunnels selected by the remote gateway device 106. For certain implementations, the remote gateway device 106 functions to route data traffic received from the central gateway system 102 (e.g., return data traffic responsive to a request originating from one of the client devices 108) to one or more of the client devices 108.

In some implementations, the remote gateway device 106 generates application information associated with the data traffic receives from one or more of the client devices 108, and may or may not do so as part of identifying an application or an application type associated with the data traffic. In specific implementations, the application information generated by the remote gateway device 106 is sent to the central gateway system 102, possibly before the data traffic is routed to the central gateway system 102 or along with the data traffic routed to the central gateway system 102). For some such implementations, the central gateway system 102 utilizes the application information provided by the remote gateway device 106 in routing return data traffic back to the remote gateway device 106. For example, the application information can cause the central gateway system to route data traffic, intended for one of the client devices 108, over certain tunnels between the remote gateway device 106 and the central gateway system 102, where the certain tunnels area determined based on application or application type associated with the data traffic. In some implementations, sending application information from the remote gateway device 106 to the central gateway system 102 comprises including a network flow tag, associated with the application or the application type, in the data traffic before the data traffic is routed to central gateway system 102. Depending on the implementation, the network flow tagging can be implemented using IEEE 802.1Q Virtual LAN (VLAN) tags or by Multiprotocol Label Switching (MPLS) tag, or using the MAC address associated with the central gateway system 102 or the remote gateway device 106.

In the example system shown in FIG. 1, the client devices 108 are coupled to the remote gateway device 106. Through the coupling, the client devices 108 can form a LAN or part of a LAN with the remote gateway device 106. In some implementations, the client devices 108 are configured to send and receive data over a network through a network connection. Depending upon the specific implementation, one or more of the client devices 108 can be: a mobile device, such as a smart phone, personal digital assistant (PDA), or wearable electronic device; a semi-mobile device, such as a notebook or laptop computer, or other device that is generally considered portable; or a device generally not considered to be mobile, such as a desktop computer. Additionally, for some implementations, one or more of the client devices 108 are a thin client device or an ultra-thin client device.

In some implementations, one or more of the client devices 108 are coupled to the remote gateway device 106 through a wireless (network) connection or a wired (network) connection. For certain implementations, the one or more the client devices 108 send data to and receive data from the remote gateway device 106. For instance, one or more of the client devices 108 can communicate data to and from the remote gateway device 106 over a wireless connection coupling the client devices 108 to the remote gateway device 106. A wireless connection that couples one of the client devices 108 to the remote gateway device 106 may or may not be IEEE 802-compatible. As used herein, IEEE 802 standards terminology is used by way of relatively well-understood example to discuss implementations that include wireless techniques that connect stations through a wireless medium. A network device, as used in this paper, refers to as a device having a media access control (MAC) address and a physical layer (PHY) interface to a wireless medium that complies with the IEEE 802 standards. IEEE 802.1, IEEE 802.3, IEEE 802.11a-1999, IEEE 802.11b-1999, IEEE 802.11g-2003, IEEE 802.11-2007, and IEEE 802.11n TGn Draft 8.0 (2009) are incorporated by reference.

In FIG. 1, the client devices 108 can send (e.g., transmit) and receive data traffic over a network through the remote gateway device 106. In certain implementations, the computer-readable medium 104 implements one or more networks, one or more of the client devices 108 are coupled to the remote gateway device 106 through a wireless or wired network connection, and the client devices 108 exchanges data traffic with the networks by way of the network connection with the remote gateway device 106. Data traffic being sent through the remote gateway device 106 by can include one or more data requests addressed to a network server or service available over a network through the remote gateway device 106, and one or more data replies from the network server or service responsive to the data requests. For a given client device, the data request may or may not be one associated with an application (e.g., Layer-7 request) operating on the given client device. A data request can be addressed from a given client device to a specific network server or service, and a data response can be addressed from a specific network server or service to a given client device. For some implementations, a data request that associated with a particular application (e.g., Spotify®) or application type (e.g., streaming video) causes the network server or service to respond to the client device with a data response associated with that particular application or application type.

In the example of operation, one or more of the servers 110 function to send and receive data with one or more of the client devices 108, and can do so through the central gateway system 102 and the remote gateway device 106. In the example system shown in FIG. 1, the servers 110 are coupled to the computer-readable medium 104. In FIG. 1, the servers 110 are intended to represent network servers, network services, or other network resources, which may or may not be implemented using cloud-based resources. One or more of the servers 110 can be associated with a particular application or application type, such as Skype®, YouTube®, Google®, Gmail®, Spotify®, Twitter®, Facebook®, BitTorrent, instant message (IM), voice-over-IP (VoIP), computer games, or the like.

As described herein, in some implementations, the servers 110 is part of a private network that includes the central gateway system 102, and the remote gateway device 106 (and the client devices 108) accesses the servers 110 by way of the central gateway system 102 using one or more tunnels established between the remote gateway device 106 and the central gateway system 102. In some implementations, one or more tunnels between the central gateway system 102 and the remote gateway device 106 a VPN connection between the central gateway system 102 and the remote gateway device 106, whereby the central gateway system 102 serves as a VPN gateway (or VPN terminator), and the remote gateway device 106 serves as a VPN client. Through the VPN connection, access to a private network that includes the central gateway system 102 and the servers 110 can be extended to a local network that includes the remote gateway device 106 and the client devices 108.

Figure 2:
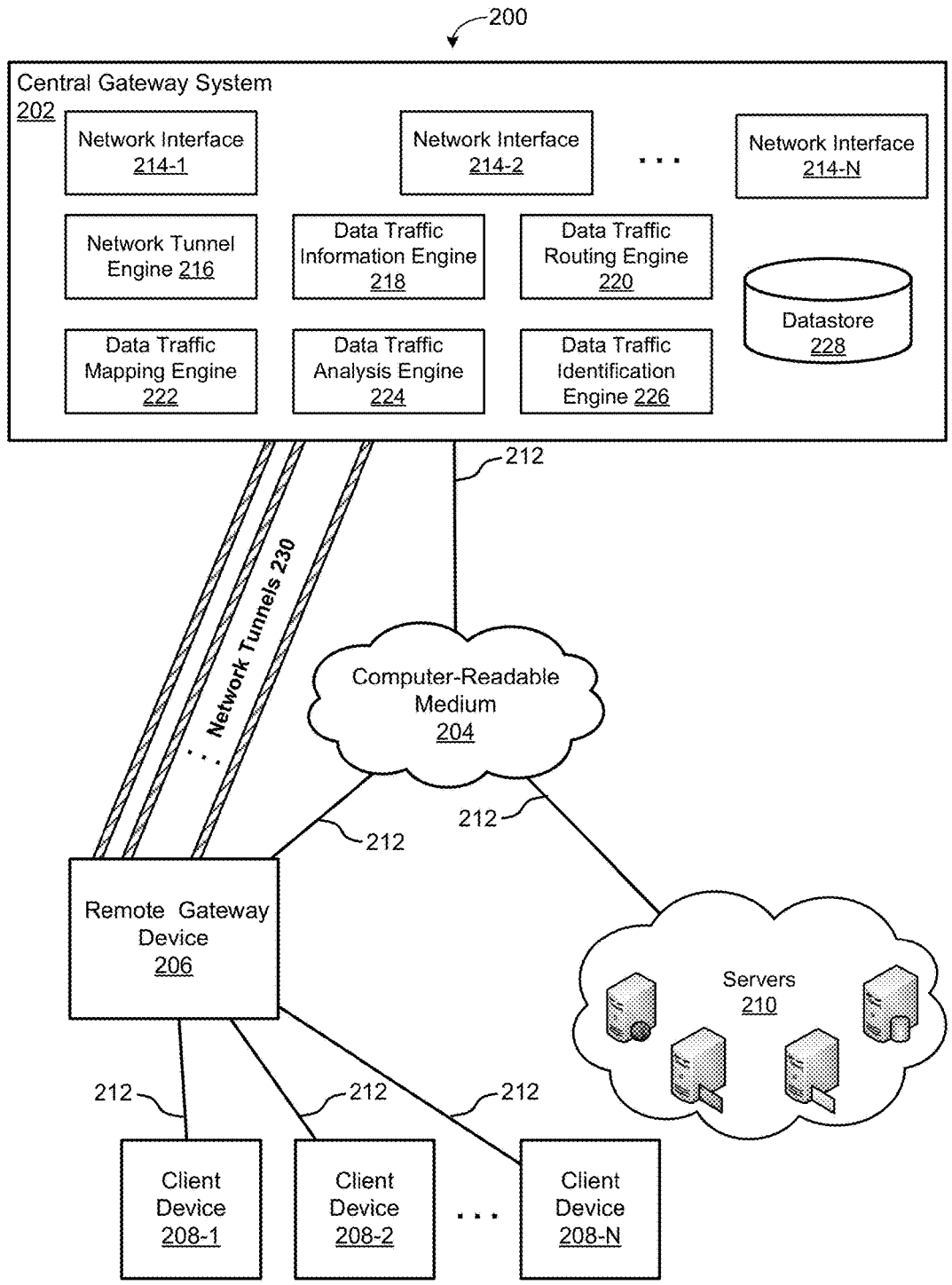
FIG. 2 depicts a diagram of an example of a system for routing data traffic using tunnels.

FIG. 2 depicts a diagram 200 of an example of a system for routing data traffic using tunnels. The diagram 200 includes a computer readable medium 204, data paths 212, a central gateway system 202 coupled to the computer readable medium 204 by way of one of data paths 212, a remote gateway device 206 coupled to the computer readable medium 204 by way of one of the data paths 212, one or more client devices 208-1 to 208-N (collectively referred to as client devices 208) coupled to the remote gateway device 206 by way of one or more of the data paths 212, and one or more servers 210 coupled to the computer readable medium 204 by way of one or more of the data paths 212. As shown in FIG. 2, one or more network tunnels 230 have been established between the remote gateway device 206 and the central gateway system 202. For some implementations, the servers 210 provide application services or other network services (e.g., database application, enterprise application, streaming multimedia application, etc.), which can be accessed by the one or more client devices 208 through the central gateway system 202. For some such implementations, the one or more client devices 208 access the central gateway system 202 by way of the remote gateway device 206 and the one or more network tunnels 230 established between the central gateway system 202 and the remote gateway device 206.

In the example of FIG. 2, the remote gateway device 206 can be configured to receive data traffic from one or more of the client devices 208 and route it to the central gateway system 202 over one or more of the network tunnels 230. In some implementations, the remote gateway device 206 includes a data traffic routing policy that causes the remote gateway device 206 to select and then use particular ones of the network tunnels 230 to route data traffic from one or more of the client devices 208 to the central gateway system 202. In certain implementations, the remote gateway device 206 analyzes data traffic received from one or more of the client devices 208, identifies an application or application type associated with the data traffic, and then selects to use one or more select network tunnels, from the network tunnels 230, to send the data traffic to the central gateway system 202. The remote gateway device 206 can also be configured to route data traffic (e.g., return data traffic) received from the central gateway system 202, over one or more of the network tunnels 230, to one or more of the client devices 208.

In some implementations, the remote gateway device 206 sends data traffic-to-tunnel information to the central gateway system 202 to dictate how the central gateway system 202 routes return data traffic from the central gateway system 202 to the remote gateway device 206. In some implementations, the data traffic-to-tunnel information comprises an n-tuple of network flow information or application-to-tunnel binding information, which the central gateway system 202 can implement into a data traffic-to-tunnel mapping. Such a data traffic-to-tunnel mapping can instruct the central gateway system 202 on which of the network tunnels 230 should be used when return data traffic from one or more of the servers 210, intended for one or more client devices 208, is forwarded from the central gateway system 202 to the remote gateway device 206. In some implementations, the data traffic-to-tunnel mapping defines which of the network tunnels 230 corresponds to data traffic associated with a particular application or application type.

In various implementations, the remote gateway device 206 tags data traffic with network flow tags before the data traffic is routed from the remote gateway device 206 to the central gateway system 202 using one or more of the network tunnels 230. In some implementations the network flow tags are associated with one or more application or application types. By tagging data traffic with a network flow tag associated with an application or an application type, when the central gateway system 202 receives the tagged data traffic over select tunnels, the central gateway system 202 can be informed to use the select tunnels for routing return data traffic associated with the application or application type from the central gateway system 202 to the remote gateway device 206. This can ensure data traffic associated with a particular application or application is communicated between the remote gateway device 206 and the central gateway system 202 over a single network tunnel (or over a predetermined set of network tunnels), which may not be possible using IP addresses when there is more than one network tunnel established between the remote gateway device 206 and the central gateway system 202. In some implementations, a single MAC address (e.g., of the remote gateway device 206 or one of the client devices 208) is used as the network flow tag. In some implementations, IEEE 802.1Q virtual LAN (VLAN) tagging or Multiprotocol Label Switching (MPLS) tagging is utilized.

In the example of FIG. 2, the central gateway system 202 includes one or more network interfaces 214-1 to 214-N (collectively referred to as network interfaces 214), a network tunnel engine 216, a data traffic information engine 218, a data traffic routing engine 220, a data traffic mapping engine 222, a data traffic analysis engine 224, a data traffic identification engine 226, and a datastore 228. In some implementations, one or more of the network tunnel engine 216, the data traffic information engine 218, the data traffic routing engine 220, the data traffic mapping engine 222, the data traffic analysis engine 224, the data traffic identification engine 226, and the datastore 228 can be implemented as a computer system.

In the example of FIG. 2, the network interfaces 214 can be configured to facilitate network communication between the central gateway system 202 and the remote gateway device 206 over the computer-readable medium 204. In some implementations, the central gateway system 202 utilizes one or more of the network interfaces 214 to receive data traffic (e.g., intended for one of the servers 210) from the remote gateway device 206, and send data traffic (e.g., return data traffic from one of the servers 210) to the remote gateway device 206. The data traffic received from the remote gateway device 206, by the central gateway system 202, may or may not have originated from one or more of the client devices 208. Conversely, data traffic sent from the central gateway system 202 to the remote gateway device 206 can then be routed by the remote gateway device 206 to one or more of the client devices 208. Depending on the implementation, each of the network interfaces 214 can be a physical network interface that can establish a wired or wireless network connection to a network using various network technologies and standards (e.g., Ethernet, 802.11, 3G, 4G, etc.). As such, the network interfaces 214 can each be associated with a different type network, such as Ethernet network, 2G wireless network, 4G wireless network, Wi-Fi network, or the like. In some implementations, the central gateway system 202 utilizes one or more of the network interfaces 214 to establish the network tunnels 230 with the remote gateway device 206. For some implementation, each of the network tunnels 230 established with the remote gateway device 206 is bound to one or more of the network interfaces 214.

In the example of FIG. 2, the network tunnel engine 216 can be configured to establish one or more of the network tunnels 230 between the central gateway system 202 and the remote gateway device 206 over the computer-readable medium 206. Depending on the implementations, the one or more network tunnels can be established can using Control and Provisioning of Wireless Access Points (CAPWAP), Lightweight Access Point Protocol (LWAPP), Oplet Runtime Environment (ORE), Generic Routing Encapsulation (GRE), secure shell (SSH), and the like. In some implementations, the network tunnel engine 216 establishes a virtual private network (VPN) connection with the remote gateway device 206, whereby the remote gateway device 206 operates as a VPN client and the central gateway system 202 operates as a VPN terminator.

In the example of FIG. 2, the data traffic information engine 218 can be configured to receive data traffic-to-tunnel information from the remote gateway device 206. For some implementations, the data traffic-to-tunnel information comprises an n-tuple of network flow information or application-to-tunnel binding information, which the central gateway system 202 can implement into a data traffic-to-tunnel mapping. Such a data traffic-to-tunnel mapping can instruct the central gateway system 202 on which of the network tunnels 230 should be used when return data traffic from one or more of the servers 210, intended for one or more client devices 208, is forwarded from the central gateway system 202 to the remote gateway device 206. In some implementations, the data traffic-to-tunnel mapping defines which of the network tunnels 230 corresponds to data traffic associated with a particular application or application type.

In the example of FIG. 2, the data traffic routing engine 220 can be configured to receive data traffic from the remote gateway device 206 and forward the data traffic to a network service, such as those provided by one or more of the servers 210. In some implementations, the central gateway system 202 receives such data traffic over one or more of the network tunnels 230. Subsequently, when data traffic (e.g., return data traffic) intended for one or more of the client devices 208 is received from a network service, the data traffic routing engine 220 can forward such data traffic to the remote gateway device 206 over one or more of the network tunnels 230. The network tunnels utilized by the data traffic routing engine 220 to forward the data traffic can be selected based on a data traffic-to-tunnel mapping maintained by the central gateway system 202, and possibly stored on the datastore 228.

In the example of FIG. 2, the data traffic mapping engine 222 can be configured to incorporate data traffic-to-tunnel information received from the remote gateway device 206 into a data traffic-to-tunnel mapping maintained at the central gateway system 202. In some implementations, the data traffic-to-tunnel mapping instructs the central gateway system 202 on which of the network tunnels 230 should be used when forwarding data traffic to the remote gateway device 206. The data traffic forwarded to the remote gateway device 206 may or may not be received from one or more of the servers 210, and may or may not be intended for one or more client devices 208. In particular implementations, the data traffic-to-tunnel mapping defines which of the network tunnels 230 correspond to data traffic associated with a particular application or application type. In some implementations, the data traffic-to-tunnel mapping is stored on the datastore 228.

In the example of FIG. 2, the data traffic analysis engine 224 can be configured to analyze data traffic to be forwarded to the remote gateway device 206 (e.g., for one or more of the client devices 208). The data traffic may or may not be received from one or more of the servers 210. In some implementations, the data traffic analysis engine 224 performs deep packet inspection (DPI) on one or more data packets included in the data traffic received. The data traffic analysis engine 224 can use DPI to learn Layer-7 characteristics of the (data) payloads of data packets included in the data traffic.

In the example of FIG. 2, the data traffic identification engine 226 can be configured to identify one or more applications or application types associated with data traffic to be forwarded to the remote gateway device 206 (e.g., for one or more of the client devices 208). In particular implementations, the data traffic identification engine 226 identifies the applications or application types using the data traffic analysis performed on the data traffic by the data traffic analysis engine 224. By identifying the applications or application types associated with data traffic to be forwarded, the data traffic identification engine 226 can classify the data traffic as it is received. In some implementations, the application or application types with which the data traffic can be associated are stored by the datastore 228.

In the example of FIG. 2, the datastore 228 can be configured to maintain persistent data for use by the central gateway system 202 during its operations. In some implementations, the datastore 228 stores one or more of application or application types identified by the data traffic identification engine 226, a data traffic-to-tunnel mapping utilized by the data traffic routing engine 220 to route data traffic from the central gateway system 202 to the remote gateway device 206.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Figure 3:
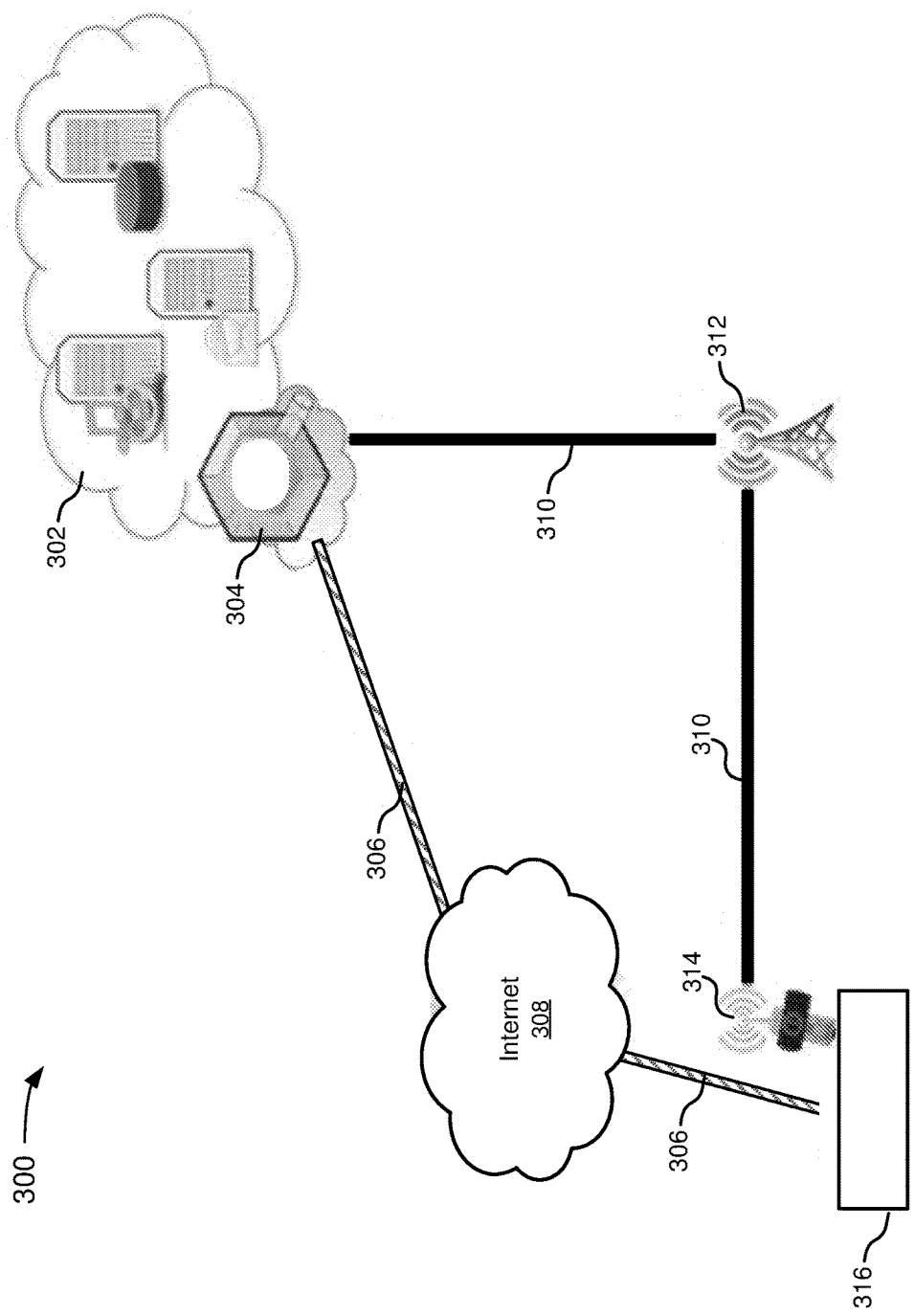
FIG. 3 depicts a diagram of an example of a system for routing data traffic using tunnels in which a branch having two forwarding network paths accesses a server.
Figure 4:
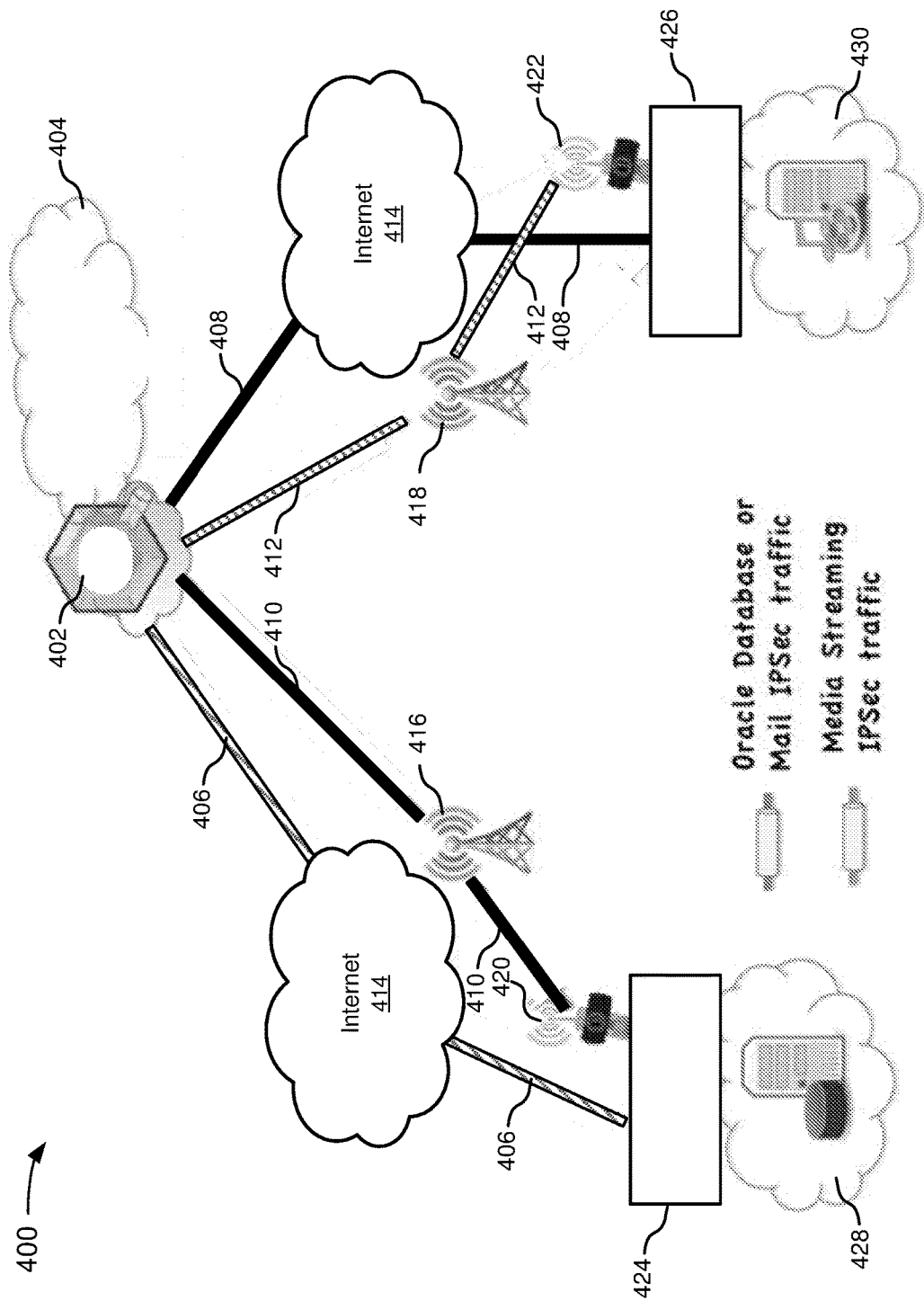
FIG. 4 depicts a diagram of an example of a system for routing data traffic using tunnels in which more than one branch needs to access a server.

FIG. 3 depicts a diagram 300 of an example of a system for routing data traffic using tunnels in which a branch having two forwarding network paths accesses a server. The diagram 300 includes one or more application servers 302, a central gateway system 304 having access to the application servers 302, the Internet 308, and a branch router 316 that can serve as a remote gateway device to one or more client devices. The branch router 318 may or may not be an access point at a branch office. For some implementations, the application servers 302 is part of a private network (e.g., of a headquarter data center) accessible to the central gateway system 304. As shown in FIG. 4, the branch router 316 has a network tunnel 306 established with the central gateway system 402 over the Internet 308 by way of a wired modem (e.g., DSL or cable modem, not shown), and another network tunnel 310 established with the central gateway system 304 over a wireless data carrier 312 (e.g., cellular network) by way of a wireless modem 314.

Depending on the implementation, one or more of the network tunnels 306 and 310 can be implemented using Internet Protocol Security (IPsec) tunneling or the like. Additionally, depending on the implementation, the central gateway system 304 can be implemented by a standalone network device or as a cloud-based resource (e.g., cloud virtual gateway—CVG). The Internet 308 is used in diagram 300 for illustrative purposes and should be understood to represent any form of network. Such a network can include one or more wide area networks (WANs), a metropolitan area networks (MANs), campus area network (CANs), local area networks (LANs), personal area networks (PANs), home area networks (HANs), private networks, public networks, and secure networks, and unsecure networks. The application servers 302 can include servers that provide for an enterprise collaboration application, a database application, an electronic mail application, streaming multimedia application, and the like.

In some implementations, one or more client devices at the branch router 316 access application services provided by one or more of the application servers 302 by way of the central gateway system 304. Additionally, in some implementations, the client devices at the branch router 318 access the central gateway system 304 over either the network tunnel 306 or 310 in accordance with a data traffic routing policy installed at the branch router 318. The data traffic routing policy can cause the branch router 318 to route data traffic, associated with a particular application or application type, to be routed to the central gateway system 304 over one or more of the network tunnels 306 and 310. In some implementations, the branch router 318 will route data traffic associated with a particular application or application type over one of the network tunnels 306 and 310 at the exclusion of all others.

In some implementations, the central gateway system 304 includes a data traffic routing policy that causes the central gateway system 304 to route data traffic, received by the central gateway system 402, according to application data content. In particular implementations, the central gateway system 304 receives data traffic, intended for one of the application servers 302, from the branch router 318 (e.g., such a request originating from a client device at the branch router 318) over the network tunnel 306. The central gateway system 304 can forward the data traffic from the branch router 318 to the intended one of the application servers 302. As the data traffic passes through the central gateway system 304, the central gateway system 304 can analyze and identify an application or an application type associated with the data traffic. This can be later used by the central gateway system 304 to ensure that data traffic subsequently received by the central gateway system 304 and to be forwarded to the branch router 316 (e.g., to reach a client device at the branch router 316) can be forwarded using the same network tunnel upon which data traffic associated with the same application or application type was received from the branch router 316. In this way, the central gateway system 304 can prevent or reduce asymmetric routing of application data traffic to and from the branch router 316.

In some implementations, the branch router 316 provides the data traffic-to-tunnel information that instructs the central gateway system 304 on which of the network tunnels 306 and 310 should be used when data traffic associated with a particular application or application type is forwarded by the central gateway system 304 to the branch router 316. For some implementations, the central gateway system 304 implements the data traffic-to-tunnel information into a data traffic-to-tunnel mapping that enables the central gateway system 304 to map data traffic of a certain application or application type to one or more appropriate data tunnels as determined by the branch router 316. In particular implementations, a branch network administrator defines the data traffic-to-tunnel information (e.g., by configuring the branch router 316) in order to dictate how the central gateway system 304 should forward data traffic from the central gateway system 304 to the branch router 316 using one or more of the network tunnels 306 and 310. For instance, the branch network administrator can define the data traffic-to-tunnel information such that multimedia streaming data traffic (e.g., provided by one of the application servers 302) is forwarded from the central gateway system 304 to the branch router 316 by way of the network tunnel 306, and such that database application data traffic (e.g., provided by one of the application servers 302) is forwarded from the central gateway system 304 to the branch router 316 by way of the network tunnel 310. In various implementations, the central gateway system 304 determines an application or an application type associated with data traffic (e.g., return data traffic) by analyzing the Layer-7 network data contained in the data traffic.

FIG. 4 depicts a diagram 400 of an example of a system for routing data traffic using tunnels in which more than one branch needs to access a server. The diagram 400 includes a central gateway system 402 having access to a private network 404 (e.g., of a headquarter data center), the Internet 414, a first branch router 424 that can serve as a remote gateway device to one or more client devices at a first branch office, a second branch router 426 that can serve as a remote gateway device to one or more client devices at a second branch office, a database application server 428 on a local network with the first branch router 424, and a multimedia application server 430 on a local network with the second branch router 426. The first branch router 424 may or may not be an access point at a first branch office, and the second branch router 426 may or may not be an access point at a second branch office. As shown in FIG. 4, the first branch router 424 has a network tunnel 406 established with the central gateway system 402 over the Internet 414 by way of a wired modem (e.g., DSL or cable modem, not shown), and another network tunnel 410 established with the central gateway system 402 over a wireless data carrier 416 (e.g., cellular network) by way of a wireless modem 420. As also shown in FIG. 4, the second branch router 426 has a network tunnel 408 established with the central gateway system 402 over the Internet 414 by way of a wired modem (not shown), and another network tunnel 412 established with the central gateway system 402 over a wireless data carrier 418 (e.g., cellular network) by way of a wireless modem 422. Depending on the implementation, one or more of the network tunnels 406, 408, 410, and 412 can be implemented using Internet Protocol Security (IPsec) tunneling or the like. Additionally, depending on the implementation, the central gateway system 402 can be implemented by a standalone network device or as a cloud-based resource (e.g., cloud virtual gateway—CVG). The Internet 414 is used in diagram 400 for illustrative purposes and should be understood to represent any form of network. Such a network can include one or more wide area networks (WANs), a metropolitan area networks (MANs), campus area network (CANs), local area networks (LANs), personal area networks (PANs), home area networks (HANs), private networks, public networks, and secure networks, and unsecure networks.

In some implementations, the first branch router 424 is located at a first company site, such as a first branch office, and the second branch router 426 is located at a second company site, such as a second branch office. In various implementations, the first branch router 424 and the second branch router 426 are two different branch routers located at the same company site.

In some implementations, one or more client devices at the first branch router 424 access application services (e.g., multimedia application server 430) provided through the second branch router 426, or application services provided from the private network 404, by way of the central gateway system 402. Additionally, in some implementations, the client devices at the first branch router 424 access the central gateway system 402 over either the network tunnel 406 or 410 in accordance with a data traffic routing policy installed at the first branch router 424. The data traffic routing policy installed at the first branch router 424 can cause the first branch router 424 to route data traffic associated with a particular application or application type over one of the network tunnels 406 and 410 at the exclusion of all others.

In some implementations, one or more client devices at the second branch router 426 access application services (e.g., multimedia application server 430) provided through the first branch router 424, or application services provided from the private network 404, by way of the central gateway system 402. Further, in some implementations, the client devices at the second branch router 426 access the central gateway system 402 over either the network tunnel 408 or 412 in accordance with a data traffic routing policy installed at the second branch router 426. The data traffic routing policy installed at the second branch router 426 can cause the second branch router 426 to route data traffic associated with a particular application or application type over one of the network tunnels 408 and 412 at the exclusion of all others.

In some implementations, one or more client devices at the first branch router 424 need to access the multimedia application server 430 and in some implementations one or more client devices at the second branch router 426 need to access the database application server 428. In particular implementations, the first branch router 424 is configured with a data traffic routing policy that causes the first branch router 424 to route data traffic associated with the database application server 328 from the first branch router 424 to the central gateway system 402 over the network tunnel 406 rather than the network tunnel 410. In particular implementations, the second branch router 426 is configured with a data traffic routing policy that causes the second branch router 426 to route data traffic associated with the multimedia application server 430 from the second branch router 426 to the central gateway system 402 over the network tunnel 412 rather than the network tunnel 408.

In some implementations, the central gateway system 402 includes a data traffic routing policy that causes the central gateway system 402 to route data traffic, received by the central gateway system 402, according to application data content. For example, when the central gateway system 402 receives from the first branch router 424 a request for the multimedia application server 430 over the network tunnel 410, the data traffic routing policy configured at the central gateway system 402 can cause the central gateway system 402 to forward the request intended for the multimedia application server 430 to the second branch router 426 over the network tunnel 408. Subsequently, when the multimedia applications server 430 returns data traffic in response to the request, the data traffic routing policy included by the central gateway system 402 can cause the central gateway system 402 to forward back to the first branch router 424 over the same network tunnel 410 through which the request original was received from the first branch router 424. In this way, the central gateway system 402 can prevent asymmetric routing for a given application or application type. The forwarding of data traffic to the first branch router 424 over the network tunnel 410 can be performed by the central gateway system 402 based on application data contained in the return data traffic, rather than based on the destination IP address or the source IP address included the return data traffic. The central gateway system 402 can apply the data traffic routing policy in this manner by analyzing the application or application type associated with the data traffic (e.g., request for the multimedia application) and routing the data traffic through one of the network tunnels 406, 408, 410, and 412 based on the associated the application or application type.

In some implementations, both the branch routers 424 and 426 install application-based data traffic routing policy for the multimedia-streaming and database-application data traffic, and the central cloud gateway is aware of application-based routing in order to prevent or reduce asymmetric routing for data traffic associated with an application or an application type. In particular implementations, the data traffic routing policy can be installed in one or more of the first branch router 424, the second branch router 426, and the central gateway system 402 by running a proprietary dynamic routing protocol to advertise the application specific route from one router to other routers in a routing domain (e.g., such as the one used in Aerohive® routing domains).

Figure 5:
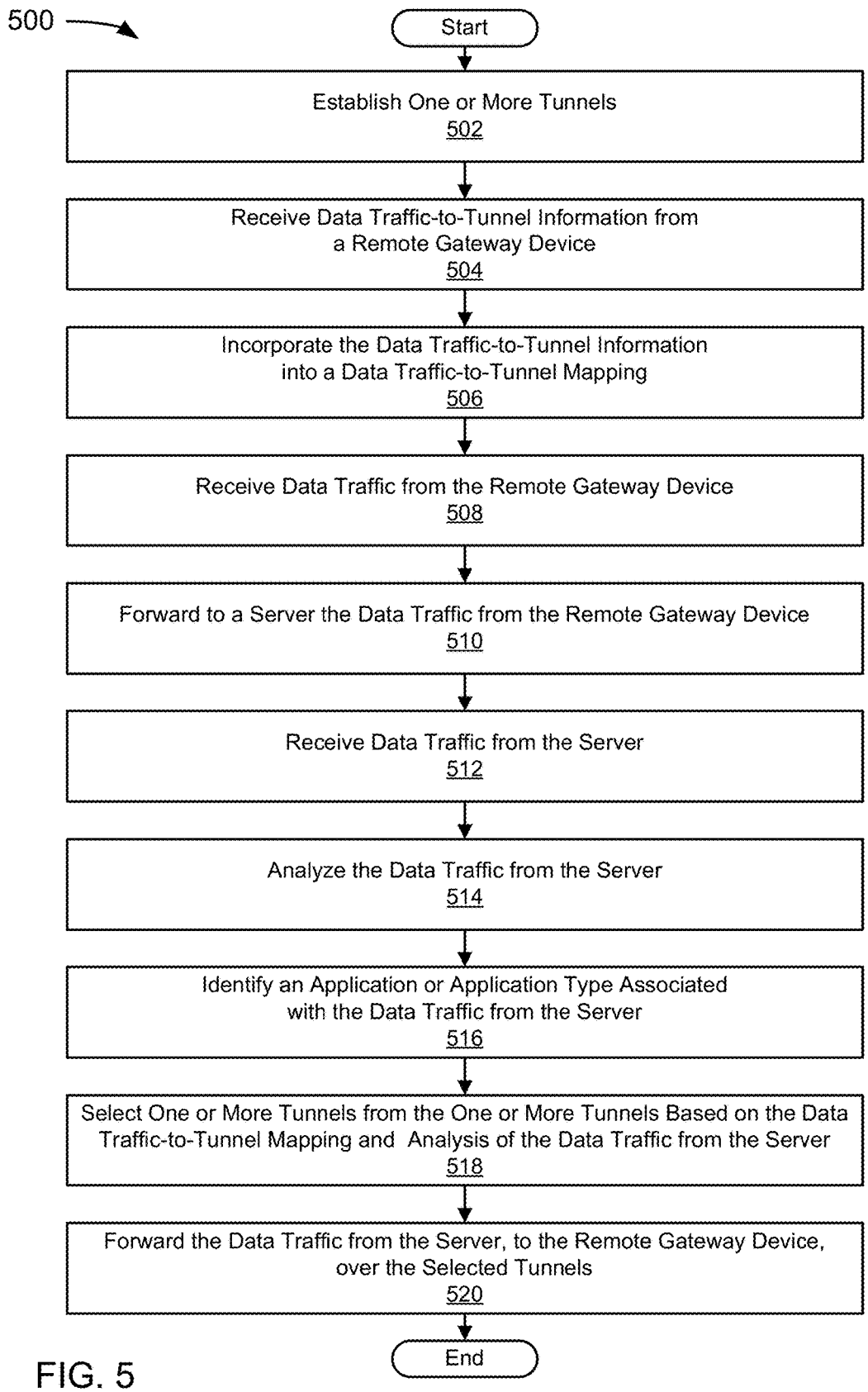
FIG. 5 depicts a flowchart of an example of a method for routing data traffic using tunnels.

FIG. 5 depicts a flowchart 500 of an example of a method for routing data traffic using tunnels. The method illustrated by the flowchart 500 can implement a tunneling (e.g., single-MAC tunneling) of data traffic in a multi-path networking environment. The flowchart 500 is presented as a series of modules, but, in some implementations, the modules of the flowchart 500 can be reordered to a permutation of the illustrated order of modules or reorganized for parallel execution. The example flowchart 500 shown in FIG. 5 begins at module 502, where one or more tunnels are established over a network. In some implementations, the tunnels are established between a remote gateway device and a central gateway system over a network, such as the Internet or the like. In specific implementations, the central gateway system is part of, or facilitates access to, a headquarter data center. In particular implementations, the remote gateway device is implemented by a network device, such as a router, switch, bridge, or access point (AP), at a branch office. There may or may not be multiple tunnels between the central gateway system and the remote gateway device. In some implementations, single-MAC tunneling is utilized to establish one or more tunnels between the central gateway system and the remote gateway device.

The example flowchart 500 shown in FIG. 5 continues to module 504, where data traffic-to-tunnel information a remote gateway device is received. By module 504, a remote gateway device can inform a central gateway system which tunnel or tunnels to use when routing data from the central gateway system to the remote gateway device. In some implementations, the central gateway system directly or indirectly receives the data traffic-to-tunnel information from the remote gateway device. In some implementations, the data traffic-to-tunnel information comprises an n-tuple of network flow information, which can bind data traffic associated with an application or an application type to a network flow. In specific implementations, the n-tuple of network flow information is a 5-tuple comprising {network source, network destination, product type, network flow identifier, port identifier}. In particular implementations, the n-tuple of network flow information is a 1-tuple comprising {a MAC address}, which can be associated with a central gateway system, a remote gateway device, or a client device. In various implementations, a network flow tag is utilized in place of, or in addition to, n-tuple network flow information. Advantageously, by a remote gateway device using flow tagging, a central gateway system can be instructed as to which return tunnel or tunnels to use for a given traffic flow, which may or may not utilize a single MAC address (rather than two IP addresses for two interfaces).

The example flowchart 500 shown in FIG. 5 continues to module 506, where data traffic-to-tunnel information is incorporated into a data traffic-to-tunnel mapping. In some implementations, an n-tuple of network flow information is installed into data traffic-to-tunnel mapping. In this way, a central gateway system can implement the preferences of a remote gateway device when selecting tunnel or tunnels for routing data traffic from the central gateway system to the remote gateway device.

The example flowchart 500 shown in FIG. 5 continues to module 508, where data traffic is received from a remote gateway device. In some implementations, the data traffic comprises data traffic from one or more applications at the remote gateway device, or one or more client devices coupled to the remote gateway device. In specific implementations, the remote gateway device is a remote virtual private network (VPN) gateway. The VPN gateway can be considered remote because the VPN gateway is not local to a relevant end-point in a source-to-destination communication. In some implementations, the data traffic received from the remote gateway device is data traffic that the remote gateway device receives from a client device that is communicating with the remote gate way device, possibly over a wireless local area network (WLAN).

The example flowchart 500 shown in FIG. 5 continues to module 510, where data traffic from a remote gateway device is forwarded to a server. In some implementations, the data traffic is forwarded to a server associated with a service being accessed by a client device communicating through a remote gateway device, possibly over a wireless local area network (WLAN).

The example flowchart 500 shown in FIG. 5 continues to module 512, where data traffic is received from a server. In some implementations, the data traffic received from the server is responsive to the data traffic forwarded from a remote gateway device to the server.

The example flowchart 500 shown in FIG. 5 continues to module 514, where data traffic from a server is analyzed. Additionally, the example flowchart 500 shown in FIG. 5 continues to module 516, where an application or application type associated with data traffic is identified. In some implementations, the data traffic from the server is analyzed to facilitate identification of an application or an application type associated with the data traffic. In some implementations, module 514 analyzes the data traffic by performing deep packet inspect (DPI) on data packets included in the data traffic, which can result in analysis of Layer-7 network data contained in the data traffic. By analyzing the data traffic and by identifying the application or the application type associated with the data traffic, modules 514 and 516 can classify the data traffic for routing from a server to a remote gateway device, using one or more tunnels, according to the classification.

The example flowchart 500 shown in FIG. 5 continues to module 518, where one or more tunnels are selected based on a data traffic-to-tunnel mapping and further based on analysis of data traffic from a server. In some implementations, the data traffic-to tunnel mapping facilitates selection of one or more tunnels for data traffic being forwarded from a server to a remote gateway device. For some implementations, the data traffic-to tunnel mapping allows a network flow associated with a network-provided service to be bound to one or more particular tunnels. In this way, the data traffic-to tunnel mapping can prevent or reduce asymmetric routing of data traffic between a remote gateway device and a server, as the data traffic passes through a central gateway system that implements the data traffic-to-tunnel mapping and that has two or more tunnels established with the remote gateway device.

The example flowchart 500 shown in FIG. 5 continues to module 520, where data traffic a server is forwarded to a remote gateway device over one or more selected tunnels. In some implementations, forwarding the data traffic over the one or more selected tunnels ensures data traffic is being sent on the one or more tunnels corresponding to the data traffic-to-tunnel mapping.

As used herein, a wireless network refers to any type of wireless network, including but not limited to a structured network or an ad hoc network. Data on a wireless network is often encrypted. However, data may also be sent in the clear, if desired. With encrypted data, a rogue device will have a very difficult time learning any information (such as passwords, etc.) from clients before countermeasures are taken to deal with the rogue. The rogue may be able to confuse the client, and perhaps obtain some encrypted data, but the risk is minimal (even less than for some wired networks).

As used herein, the term "embodiment" means an embodiment that serves to illustrate by way of example but not limitation. The techniques described in the preceding text and figures can be mixed and matched as circumstances demand to produce alternative embodiments.

We claim:

1. A method comprising:
   receiving at a central gateway data traffic-to-tunnel information from a remote gateway device, wherein the remote gateway device is configured to provide wireless access to services provided by an enterprise network to at least one client device and the data traffic-to-tunnel information includes application-to-tunnel binding information including specific tunnels bound to specific applications used in providing the services to the at least one client device through the remote gateway device, the data traffic-to-tunnel information sent from the remote gateway device to the central gateway before data traffic from the at least one client device is sent from the remote gateway device over the specific tunnels to the central gateway;
   incorporating the data traffic-to-tunnel information in a data traffic-to-tunnel mapping of the specific tunnels bound to the specific applications used in providing the services, wherein the specific tunnels are established between the remote gateway device and a cloud virtual gateway (CVG) using one of a group consisting of Control and Provisioning of Wireless Access Points (CAPWAP), Lightweight Access Point Protocol (LWAPP), Oplet Runtime Environment (ORE), Generic Routing Encapsulation (GRE), and Secure Shell (SSH);
   receiving first data traffic associated with a specific application of the specific applications from a server of the enterprise network;
   performing deep packet inspection on at least one of the first data traffic to identify the specific application;
   identifying a specific tunnel of the specific tunnels associated with the specific application according to the data traffic-to-tunnel mapping;
   forwarding the first data traffic to the remote gateway device through the specific tunnel to reduce asymmetry of routing to and from the remote gateway device.

2. The method of claim 1, further comprising establishing the one or more specific tunnels.

3. The method of claim 1, further comprising receiving second data traffic from the remote gateway device.

4. The method of claim 3, further comprising forwarding the second data traffic to the server.

5. The method of claim 3, wherein the data traffic-to-tunnel information is included in the second data traffic.

6. The method of claim 1, wherein the method is performed by the CVG.

7. The method of claim 6, wherein the one or more specific tunnels are established between the remote gateway device and the CVG.

8. The method of claim 1, wherein the data traffic-to-tunnel information comprises an n-tuple of network flow information.

9. The method of claim 1, wherein the data traffic-to-tunnel information comprises network flow tag information.

10. The method of claim 1, further comprising selecting the one or more specific tunnels from a set of tunnels.

11. The method of claim 1, further comprising analyzing the first data traffic, the one or more specific tunnels being selected further based on the analyzing the first data traffic.

12. The method of claim 11, further comprising identifying an application or an application type associated with the first data traffic based on the analyzing of the first data traffic, the one or more specific tunnels being selected further based on the identifying the application or the application type.

13. A system comprising:
a data traffic information engine at a central gateway configured to receive data traffic-to-tunnel information from a remote gateway device, wherein the remote gateway device is configured to provide wireless access to services provided by an enterprise network to at least one client device and the data traffic-to-tunnel information includes application-to-tunnel binding information including specific tunnels bound to specific applications used in providing the services to the at least one client device through the remote gateway device, the data traffic-to-tunnel information sent from the remote gateway device to the central gateway before data traffic from the at least one client device is sent from the remote gateway device over the specific tunnels to the central gateway;
a data traffic mapping engine configured to incorporate the data traffic-to-tunnel information in a data traffic-to-tunnel mapping of the specific tunnels bound to the specific applications used in providing the services, wherein the specific tunnels are established between the remote gateway device and a cloud virtual gateway (CVG) using one of a group consisting of Control and Provisioning of Wireless Access Points (CAPWAP), Lightweight Access Point Protocol (LWAPP), Oplet Runtime Environment (ORE), Generic Routing Encapsulation (GRE), and Secure Shell (SSH);
one or more network interfaces configured to receive first data traffic associated with a specific application of the specific applications from a server of the enterprise network;
a data traffic analysis engine configured to perform deep packet inspection on at least one of the first data traffic to identify the specific application;
a data traffic identification engine configured to identify a specific tunnel of the specific tunnels associated with the specific application according to the data traffic-to-tunnel mapping;
a data traffic routing engine configured to receive the first data traffic from the server and forward the first data traffic to the remote gateway device through the specific tunnel to reduce asymmetry of routing to and from the remote gateway device.

14. The system of claim 13, further comprising a network tunnel engine configured to establish the one or more specific tunnels.

15. The system of claim 13, wherein at least one of the one or more network interfaces is configured to receive second data traffic from the remote gateway device.

16. The system of claim 15, wherein the data traffic routing engine is further configured to forward the second data traffic to the server.

17. The system of claim 15, wherein the data traffic-to-tunnel information is included in the second data traffic.

18. The system of claim 13, wherein the system, at least in part, implements the CVG.

19. The system of claim 18, wherein the one or more specific tunnels are established between the remote gateway device and the CVG.

20. The system of claim 13, wherein the data traffic-to-tunnel information comprises an n-tuple of network flow information.

21. The system of claim 13, wherein the data traffic-to-tunnel information comprises network flow tag information.

22. The system of claim 13, wherein the data traffic routing engine is further configured to select the one or more specfic tunnels from a set of tunnels.

23. The system of claim 13, further comprising a data traffic analysis engine configured to analyze the first data traffic before it is forwarded, the one or more specific tunnels being selected further based on analysis of the first data traffic.

24. The system of claim 23, further comprising a data classification engine configured to identify an application or an application type associated with the first data traffic based on the analysis of the first data traffic, the one or more specific tunnels being selected further based on identification of the application or the application type.

25. A system comprising:
means for receiving at a central gateway data traffic-to-tunnel information from a remote gateway device, wherein the remote gateway device is configured to provide wireless access to services provided by an enterprise network to at least one client device and the data traffic-to-tunnel information includes application-to-tunnel binding information including specific tunnels bound to specific applications used in providing the services to the at least one client device through the remote gateway device, the data traffic-to-tunnel information sent from the remote gateway device to the central gateway before data traffic from the at least one client device is sent from the remote gateway device over the specific tunnels to the central gateway;
means for incorporating the data traffic-to-tunnel information in a data traffic-to-tunnel mapping of the specific tunnels bound to the specific applications used in providing the services, wherein the specific tunnels are established between the remote gateway device and a cloud virtual gateway (CVG) using one of a group consisting of Control and Provisioning of Wireless Access Points (CAPWAP), Lightweight Access Point Protocol (LWAPP), Oplet Runtime Environment (ORE), Generic Routing Encapsulation (GRE), and Secure Shell (SSH);
means for receiving first data traffic associated with a specific application of the applications from a server of the enterprise network;
means for performing deep packet inspection on at least one of the first data traffic to identify the specific application;
means for identifying a specific tunnel of the specific tunnels associated with the specific application according to the data traffic-to-tunnel mapping;

means for forwarding the first data traffic to the remote gateway device through the specific tunnel to reduce asymmetry of routing to and from the remote gateway device.

\* \* \* \* \*

UNITED STATES PATENT AND TRADEMARK OFFICE
CERTIFICATE OF CORRECTION

PATENT NO.         : 9,820,316 B2
APPLICATION NO.    : 14/217180
DATED              : November 14, 2017
INVENTOR(S)        : Jun Tie and Changming Liu It is certified that error appears in the above-identified patent and that said Letters Patent is hereby corrected as shown below:

Claim 22, Column 24, Line 19:
"specfic tunnels from a set of tunnels." should read -- specific tunnels from a set of tunnels. --.

Signed and Sealed this
Twenty-sixth Day of June, 2018

Andrei Iancu
*Director of the United States Patent and Trademark Office*